(12) United States Patent
Trell

(10) Patent No.: US 10,305,966 B2
(45) Date of Patent: May 28, 2019

(54) SYSTEM FOR AUTHORIZATION OF ACCESS

(71) Applicant: Anders Edvard Trell, Stockholm (SE)

(72) Inventor: Anders Edvard Trell, Stockholm (SE)

(*) Notice: Subject to any disclaimer, the term of this patent is extended or adjusted under 35 U.S.C. 154(b) by 0 days.

(21) Appl. No.: 14/721,545

(22) Filed: May 26, 2015

(65) Prior Publication Data

US 2015/0341336 A1 Nov. 26, 2015

Related U.S. Application Data

(60) Provisional application No. 61/997,110, filed on May 23, 2014.

(51) Int. Cl.
*H04L 29/08* (2006.01)

(52) U.S. Cl.
CPC ............ *H04L 67/10* (2013.01); *H04L 67/025* (2013.01); *H04L 67/125* (2013.01)

(58) Field of Classification Search
CPC ... H04W 88/02; H04W 88/021; H04W 88/08; H04W 88/085; H04W 7/183; H04W 7/185; H04W 7/186; H04L 67/125; H04L 67/025; H04L 67/10; H04L 29/06; H04L 29/08; G07C 9/00126; G07C 9/00134; G07C 9/00142; G07C 9/0015; G07C 9/00158; G07C 9/00166; G07C 9/00174; G07C 9/00841; G07C 9/00896; G07C 9/00904; G07C 9/00912; G07C 9/00007–9/00103; H04N 21/4126
See application file for complete search history.

(56) References Cited

U.S. PATENT DOCUMENTS

| | | | |
|---|---|---|---|
| 4,511,970 A | 4/1985 | Okano et al. | |
| 5,157,717 A | 10/1992 | Hitchcock | |
| 6,513,119 B1 * | 1/2003 | Wenzel | G07C 9/00158 340/5.8 |
| 7,509,119 B2 | 3/2009 | Eonnet | |
| 7,835,942 B1 | 11/2010 | Pavlic et al. | |
| 8,041,016 B2 * | 10/2011 | Trell | H04M 11/025 379/167.07 |
| 8,346,672 B1 * | 1/2013 | Weiner | H04W 12/06 705/75 |
| 8,661,515 B2 * | 2/2014 | Meylemans | G06F 21/335 370/338 |
| 8,806,567 B1 * | 8/2014 | Venable, Sr. | H04L 63/0823 340/8.1 |
| 9,077,850 B1 * | 7/2015 | Groves | H04N 7/155 |
| 9,120,624 B1 * | 9/2015 | Cassady | B65G 1/137 |
| 9,301,141 B1 * | 3/2016 | Mincher | H04W 4/70 |
| 9,558,437 B2 * | 1/2017 | Osborne | G06K 19/06112 |
| 9,640,001 B1 * | 5/2017 | Vazquez | G07C 9/00007 |

(Continued)

FOREIGN PATENT DOCUMENTS

WO 00/35178 A2 6/2000

*Primary Examiner* — Nelson Giddins

(74) *Attorney, Agent, or Firm* — Jacobson Holman, PLLC.

(57) ABSTRACT

A method and device for communication and control of access including an access point containing a screen and camera whereby a visitor who is not preauthorized desires to communicate with a remote entity and uses a smartphone, holding it in line of sight of the camera, which smartphone contains indicia that is transmitted by the camera to the remote entity to obtain access.

9 Claims, 1 Drawing Sheet

(56) References Cited

U.S. PATENT DOCUMENTS

| | | | |
|---|---|---|---|
| 2005/0136892 A1* | 6/2005 | Oesterling | H04L 63/08 455/411 |
| 2006/0065733 A1* | 3/2006 | Lee | G06F 17/30879 235/462.01 |
| 2006/0114845 A1* | 6/2006 | Minborg | H04L 29/06 370/260 |
| 2006/0152578 A1* | 7/2006 | Kim | H04N 7/147 348/14.01 |
| 2006/0208088 A1* | 9/2006 | Sekiguchi | G06K 7/1095 235/472.02 |
| 2006/0293956 A1* | 12/2006 | Walker | G06Q 30/0212 705/14.14 |
| 2007/0036136 A1* | 2/2007 | Barclay | H04Q 3/0045 370/352 |
| 2008/0271131 A1* | 10/2008 | Moore | H04L 41/0806 726/9 |
| 2009/0086932 A1* | 4/2009 | Ray | H04W 4/90 379/45 |
| 2009/0324025 A1* | 12/2009 | Camp, Jr. | G07C 9/00007 382/124 |
| 2011/0000958 A1* | 1/2011 | Herzig | G06K 7/1093 235/375 |
| 2011/0010539 A1* | 1/2011 | Salomone | H04L 9/321 713/155 |
| 2011/0268276 A1* | 11/2011 | Singhal | H04L 63/0428 380/270 |
| 2011/0277023 A1* | 11/2011 | Meylemans | G06F 21/335 726/7 |
| 2012/0222055 A1* | 8/2012 | Schaefer | G06Q 20/145 725/5 |
| 2012/0287219 A1* | 11/2012 | Ravi | H04N 7/148 348/14.02 |
| 2013/0024685 A1* | 1/2013 | Kolavennu | H04L 41/0806 713/153 |
| 2013/0036231 A1* | 2/2013 | Suumaki | H04W 12/04 709/228 |
| 2013/0212182 A1* | 8/2013 | Jhang | H04L 65/403 709/205 |
| 2013/0223279 A1* | 8/2013 | Tinnakornsrisuphap | H04L 41/0809 370/254 |
| 2013/0288654 A1* | 10/2013 | Jeon | H04W 4/16 455/417 |
| 2013/0291074 A1* | 10/2013 | Dittrich | G06F 21/36 726/5 |
| 2013/0305329 A1* | 11/2013 | Zhang | G06F 21/00 726/6 |
| 2013/0309971 A1* | 11/2013 | Kiukkonen | H04L 63/107 455/41.2 |
| 2014/0028817 A1* | 1/2014 | Brockway, III | H04N 5/23206 348/61 |
| 2014/0055552 A1* | 2/2014 | Song | H04N 7/141 348/14.02 |
| 2014/0112198 A1* | 4/2014 | Pang | H04L 12/2807 370/254 |
| 2014/0169567 A1* | 6/2014 | Wendling | H04L 9/0863 380/279 |
| 2014/0215356 A1* | 7/2014 | Brander | H04L 67/36 715/753 |
| 2014/0222940 A1* | 8/2014 | Icuduygu | H04M 7/0069 709/206 |
| 2014/0229520 A1* | 8/2014 | Scott | H04L 45/00 709/202 |
| 2014/0266719 A1* | 9/2014 | Dunn | G06Q 10/06 340/541 |
| 2014/0298024 A1* | 10/2014 | Wendling | H04L 63/062 713/171 |
| 2014/0324616 A1* | 10/2014 | Proietti | G06Q 30/0601 705/26.1 |
| 2014/0359653 A1* | 12/2014 | Thorpe | G06F 21/00 725/30 |
| 2015/0007619 A1* | 1/2015 | Finney | G07F 17/10 70/58 |
| 2015/0029295 A1* | 1/2015 | Gupta | H04M 3/5116 348/14.01 |
| 2015/0067792 A1* | 3/2015 | Benoit | H04W 12/04 726/5 |
| 2015/0112883 A1* | 4/2015 | Orduna | G06Q 50/265 705/325 |
| 2015/0120040 A1* | 4/2015 | Freedman | G07F 19/203 700/232 |
| 2015/0141005 A1* | 5/2015 | Suryavanshi | H04L 67/125 455/434 |
| 2015/0228133 A1* | 8/2015 | Capaldi-Tallon | G07C 9/00039 340/5.54 |
| 2015/0256391 A1* | 9/2015 | Hardy | H04L 41/0806 709/222 |
| 2015/0312531 A1* | 10/2015 | Samad | H04N 7/186 348/143 |
| 2015/0332075 A1* | 11/2015 | Burch | G06K 7/10821 345/156 |
| 2016/0014605 A1* | 1/2016 | Robinton | G06F 21/32 726/6 |
| 2016/0165067 A1* | 6/2016 | Turner | H04W 4/029 370/352 |
| 2016/0316178 A1* | 10/2016 | Hoeffner | H04N 7/183 |
| 2017/0076522 A1* | 3/2017 | Ives-Halperin | G06Q 10/02 |
| 2017/0111613 A1* | 4/2017 | Whynot | H04L 49/35 |
| 2018/0114045 A1* | 4/2018 | Ebrahimi | H04L 9/0618 |

* cited by examiner

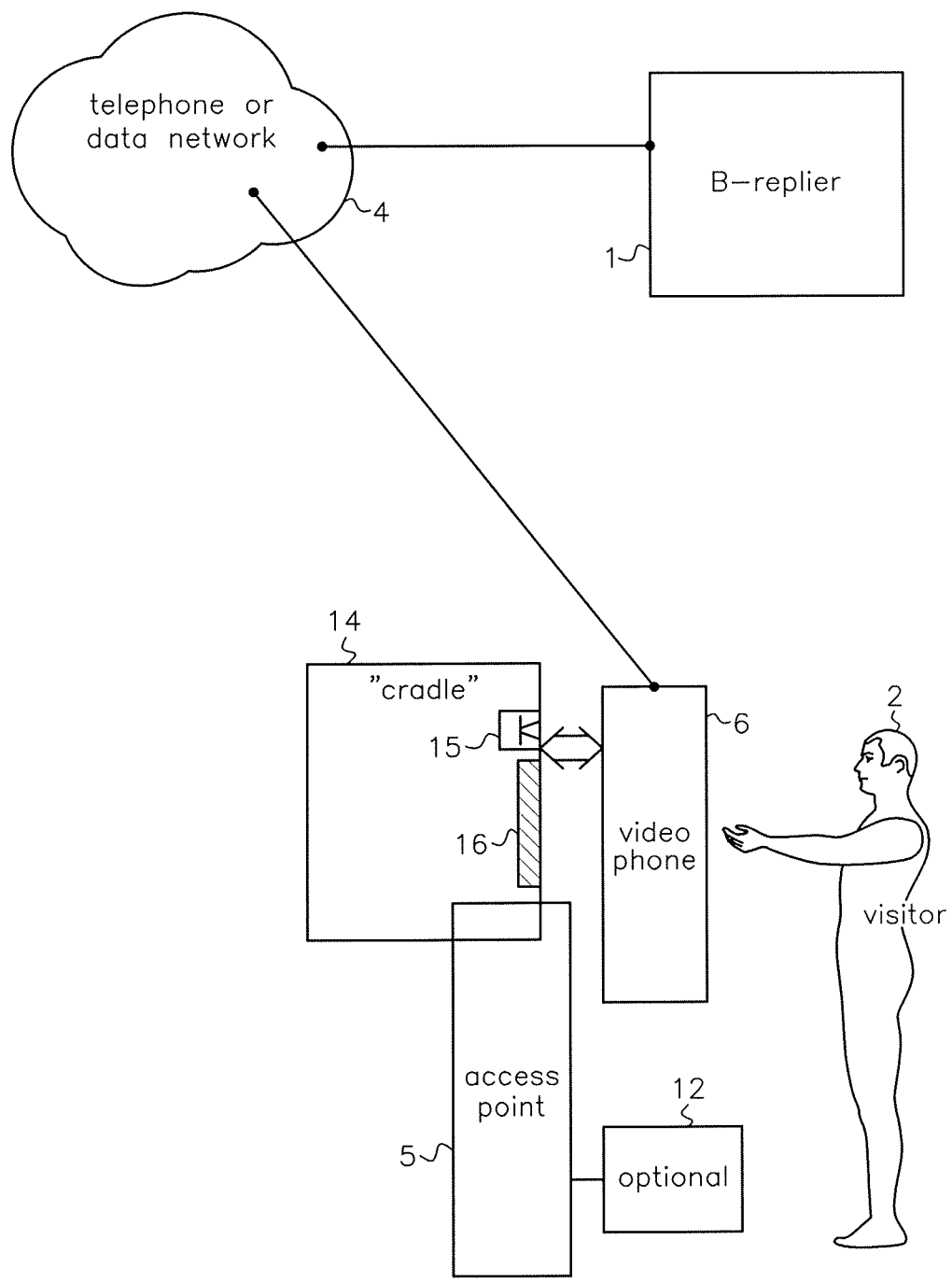

SYSTEM FOR AUTHORIZATION OF ACCESS

FIELD OF THE INVENTION

The present invention relates to a system for transaction request, information and effectuation between a person requesting access; an entity, man or machine, having authority and commanding power over the access point whereto access is requested; and the access point.

BACKGROUND OF THE INVENTION

U.S. Pat. No. 8,041,016 ("016") teaches the above by employing telephony, as opposed to e.g. in WO 00/35178 and U.S. Pat. No. 7,509,119 where a person should be in advance registered or preauthorized, and which tends to drastically reduce the number of possible users or visitors that may at any time successfully request access.

Where a stated user is not preauthorized for access either at an access point or by an authorized party, some means for the user to be in real time securely authorized and given access must be provided. Should the access point have a telephone or data network connection of its own, this is not a problem and can be solved by many available and known logging in password etc. authentication protocols. The authorized party is then contacted by the user and can evaluate and decide whether to give access or not; effectuating access by making a voice or message telephone call to the access point.

Where an access point does not have its own network connection and also the user is not preauthorized, U.S. Pat. No. 8,041,016 discusses an embodiment wherein a user's mobile telephone connected to an authorized party can relay information between that party and an access point; and wherein the stated communication format can be acoustics, IR and/or RF.

Whereas IR and RF presently are not available as standard short range communication formats with all common mobile phones e.g. NFC isn't yet available with iPhones, IR ports are by now mostly phased out; one may require some singular configuration, acoustics are immediately available at all telephones; and which accordingly has been used for data transfer for a long time. See U.S. Pat. Nos. 4,511,970; 5,157,717; 7,509,119 and 7,835,942, for example.

However and especially in noisy places, such transfer can be compromised and complicated by imperfect alignment or too low volume of either an access point or a mobile phone, slow transmission rate etc., which may tend to render acoustic coupling less suited here for secure transfer of larger data sets.

SUMMARY OF THE INVENTION

The present invention enables the above drawbacks to be overcome by disclosing a system that is both secure, advantageous and simple to implement.

Accordingly, an aspect of the present invention is directed to a system for on-the-fly authorizing a casual access requesting user or customer, herein called visitor, to gain access through an intentionally sought access point. An entity, here called "B-replier", is called by the visitor's mobile phone, and will effectuate access via a telephone network; and where the access point lacks its own telephone network connection.

Since such a transaction can be carried out regardless of whether any payment procedure is involved, and this will be herein only cursorily touched upon.

The advantages of here preferred embodiments are achievable by the visitor's mobile being a so called smartphone, aka videophone, or any modern telephone of like capacity herein called a smartphone, enabled for performing common video calls which today is a standard feature with all current phones which also practically are the only mobile phones currently in use. It is also a certain fact that today all telephone networks in general use are (Vo)IP-capable and accept video calls.

At the same time it is a fact that there still are a few concurrent, mostly free but proprietary video call standards around, like FaceTime, Wiber, Skype, WhatsApp, which might complicate the present picture a bit, but they might in time merge. The party that shall receive a video call in this context is labeled a B-replier and for this purpose a specifically assigned and designed machine can be constructed to cope with all the present video call standards. The B-replier can then be successfully called by any visitor's usual video call standard without any change in the employed videophone's usual settings. The access point, when not having its own network connection, remains totally indifferent to whatever standard is used and whose own interface means for coupling to a videophone principally comprises at least one of a camera and a screen; and is thus capable to exchange imaging information with a facing smartphone, hence letting a connected B-replier attend reciprocate.

BRIEF DESCRIPTION OF THE DRAWING

These and other aspects, advantages, applications and preferred embodiments of the present invention are provided in the following description of a preferred embodiment of the invention, being given purely by way of non-limiting example and being made with reference to the accompanying drawing, in which:

FIG. 1 schematically depicts the inventive system in a preferred embodiment.

DESCRIPTION OF A PREFERRED EMBODIMENT

FIG. 1 illustrates a preferred embodiment of the system of the invention.

For effectuating access through an access point 5 authorized party, B-replier 1, in this example being on a telephone network 4 connected machine, is called by a smartphone 6 of a visitor 2, standing before the access point 5. The smartphone 6 is video enabled and the call made is a video call.

The B-replier 1 is connected to all video call standards in use and can thus reply to the call in like standard. Further, it may collect the caller-ID of the visitor 2. It is network-connected by e.g. a GSM 4G SIM card.

The access point 5 is a specifically constructed machine for this purpose, in this example not having its own connection to telephone network 4. Instead, it has at least one camera 15 and a screen 16, in a cradle 14 for short range communication with the line-of-sight smartphone 6.

The access point 5 visibly carries an identifier that can be read by the visitor 2 and/or the smartphone 6, on the basis of which a call to the B-replier 1 can be made. The identifier can be a physical sticker or displayed on screen 16. It can be a number, which the visitor 2 and/or the smartphone 6 reads and dials and which goes to the B-replier 1; or a bar-code, e.g. such as a QR code.

The access point 5 has, in such case, computer means for self generating QR codes and showing them on an e-ink black-white screen 16; statically, when as a mere identifier; and dynamically, when e.g. responding to an appropriate input seen by its camera 15.

When the visitor 2 with smartphone 6 approaches an access point 5 displaying an identifier in form of a QR code along with directions for use and wants access, the smartphone 6 is brought in line-of-sight closer to the QR code so it can scan it. As know in the art, when a smartphone 6 scans a QR code, it can display it and convert it to an URL, i.e. it will make an IP(video)-call to any contained address, in this case the B-replier's 1, if such instructions are included in the QR code.

Thus the B-replier 1 will receive a VoIP-call from the visitor 2 over which speech as well as images will reciprocally travel. The visitor 2 can now deliver a request for access as well as the smartphone's 1 caller-ID and the displayed QR code of the access point 5.

The procedures now taking place may of course vary depending on type of access, so an exemplary example is set forth and should not to have any limiting effect or other possible embodiments. The visitor's 2 request is, in this example, delivered in speech via the smartphone 6 wherein both image and voice channels are active; and once having received the QR code, B-replier 1 can save it and the still hooked-up visitor 2 will be asked to take the smartphone 6 to talk and B-replier 1 will answer. Like many other (semi)-automated, telephonic services, the visitor 2 will be guided through and asked to dial different digits, received as DTMF:s, for various choices, such as what, numbers and/or duration of items wanted; and, if a payable access, relevant card details and so on until a complete authentication and the transaction is accomplished.

The B-replier 1 also has access to the smartphone's 6 caller-ID (telephone number) which often also is a relevant identifier and further, in many micro-payment contexts, can act as a act as an assurance for a full payment. In order to cater also for non-preauthorized visitors 2 including any visitor 2 coincidentally already known to the system, which of course increases the number of possible users, the authentication should be enough for the worth of the actual transaction; and may include a received caller-ID.

The received QR code, though, is decisively important. It positively identifies the access point 5 and also indicates the desired access. It can also provide the B-replier 1 with other useful information. Even if statically posted by screen 16, it can also be dynamic in the sense that since any last transaction also has added relevant data, like e.g. stock inventory, servicing needs, etc.

It can be further encrypted in a way mutually agreed upon, for instance after an OTP (One-Time Password), by a unique or a common, like RFC 2289, standard.

B-replier 1 now has all needed factors for authorizing/effectuating the requested access. The still on-line visitor 2 is instructed to put the smartphone 6 in front of the camera 15, for transfer of images. Seeing this done, B-replier 1 then generates a possibly encrypted, QR code containing the instructions for the transaction and which the smartphone 6 then will display for the access point 5 via the camera 15 of cradle 14. With access done, access point 5 can generate a, possibly encrypted, confirmation QR code on the screen 16 of cradle 14 which then will be seen and displayed back to the B-replier by the smartphone 6; and the visitor can then remove the smartphone 6. If any payment had been involved it is only now debited. Earlier, availability of adequate payment balance had been ascertained. It is possible that instead of the usual stating of credit card details over the voice channel, which have to go in a common mobile phone encryption, the access point 5 can have sufficient software that when camera 15 reads a card held before it, such data then to be converted into a separately encrypted QR code to be on instruction scanned and transferred by the smartphone 6 to B-replier 1. The data can be doubly encrypted by the common mobile phone standard. Same can be the case if an optional keypad 12 is provided the access point 5 and the visitor 2 enters card numbers and/or PIN codes through it. That will similarly protect the card's details when, as in QR code, it is transferred to the B-replier 1.

Also other use, like access to the interior of the access point 5 for authorized staff etc., by a keypad 12 as well as other possible optional 12 add-ons like card and/or biometric readers, can be advantageously implemented.

Besides lock control and not limiting, other advantageous access by an access point 5 of this invention can be as a vending machine, an ATM, a document issuer, a parking meter, etc.

Access point 5 can in a more elaborate embodiment also have a network connection, not shown, e.g. by a GSM SIM-card which would facilitate it to get on line with external data bases, computers etc., or form clusters etc. with groups of associated access points 5, and which may be apt for larger transactions. Most smaller applications exist where administration of large numbers of SIM-cards etc. would be disproportionate to the small scale business made by a large number of individual machines and where an embodiment as described would be more advantageous, e.g. for such small pays that cash acceptance e.g. by a coin/bill slot optional 12 can coexist. Also, an individual connection tends to make it more vulnerable to abuse and attacks from unauthorized parties or intruders.

In like applications, a single B-replier 1 could often have many access points 5. This can be facilitated by a posted or displayed identifier for each particular access point 5 as well as common and generic information can carry a signifying ID and/or use an individual OTP.

Even if any display readable code or number can be used for this invention, QR codes are here named since being now so familiar and are smartphone literate. But as the relayed images are so exclusively just between access point 5 and B-replier 1, a wholly unique image code of enough capacity can be applied; so wherever QR code is used it can mean any image code.

The disclosed optical mode of short range communication is advantageous since it is immune, quick, data capacious, already in digital format and does not call for the smartphone 6 to go into any singular own formatting/configuring etc.

Since B-replier 1 is network connected, it can contact e.g. remote databases; and which is useful if access is to be card payed. If optional 12 is a card reader, credit cards can reach (with PIN code by an optional keypad) access point 5 and be converted into an image code that B-replier 1 through its contact with the image conveying videophone 6 and program can read (,decrypt) and duly process. Also, by an optional biometric reader 12 a reliable identification of a person, rather than a mobile phone or a credit card etc., can be likewise made. This may be useful for persons with special authority, like programmers, staff etc.; and in many cases a complementing personal rather than a mere device (phone/card) identification can be more appropriate. For example, a personal identification is more appropriate when admitting people in to shared premises, like for laundry, exercise, sauna etc., and which often may not need to involve any payment transaction. By means of camera 15 and screen 16, a partaking visitor's 2 face can be captured and shown, and then conveyed by smartphone 6 to the B-replier 1, possibly for face recognition or like identification.

Where however, like with vending machines etc., payment is an issue, it is seen that many known payment models can easily be implemented, without much altering the technical setup.

DESCRIPTION OF FURTHER PREFERRED EMBODIMENTS

When there are a multitude of B-repliers 1 (not shown) and a single access point 5, like possibly by a department store or an apartment building, the invention will still advantageously work well. In a department store, a directory may help a visitor 2 to find a desired B-replier 1, whose QR-code then can be chosen and effectuated; e.g. such as a chosen vendor issuing rebate coupons, promos etc., or serving coffee.

In an apartment building, it is thought that a directory as proposed above is disadvantageous, although included in the inventive thought, since it may tend to lessen the residents' privacy by thus exposing their telephone numbers.

U.S. Pat. No. 8,041,016 also treats entrance communication, although the access point (5) there has a telephone network connection. The some cost problems with tele entry systems as there related, are here to be solved with the present invention. Therefore, a use of the present invention for entry communication purposes would be advantageous; and such a preferred embodiment will now be described.

Most of the costs associated with telephone entry systems emanates from the telephone network connection of the access point 5, which calls for connection, subscription and/or calling fees. If the access point 5 can be freed from those, costs would be minimized for the buildings. The access point 5 of this invention has no own telephone network connection, and hence no payments to any operator. It is when installed at e.g. a building, wholly implemented/programmed/etc., according to the house's own criteria and requirements. It has power and door lock connection. Further, it has a cradle 14 camera 15, but no need here for a screen 16 or any directory. Some instructions and optional 12 device(s) may supplement the installation.

As with U.S. Pat. No. 8,041,016 and for same reasons, it is preferred that a visitor 2 with his smartphone 6 calls the desired B-replier 1, knowing the domicile/telephone number of the same; and it is further here a requirement that the called phone is a videophone or similar. When the called B-replier 1 answers the call, an access requesting video conversation can commence, based on which the B-replier 1 can decide whether to grant access, e.g. unlock the entrance door and if so, the B-replier 1 sends an image to the still connected smartphone 6 of the visitor 2, without need for ending the call, so conversation can be continued all the time for e.g. instructions/guidance. This image contains all required data for authorization/effectuation of the requested access, and as discussed above it is preferably, but not limited to, a QR-code and may contain an OTP. APPs for creating QR-codes and OTP:s on smartphone(s) are freely available, so that is why they are preferred, as they facilitate identification of the visitor for the resident.

As disclosed before, access point 5 is specifically designed/programmed for being able to manage its given task. When the image appears at the visitor's 2 smartphone 6 screen and is shown to camera 15, the proper identity and legitimacy of its QR-code and possible OTP will be safely read, recognized and effectuate an intended access, e.g. open the entrance lock.

B-replier(s) 1, often here being no specifically designed device(s), but some person(s) handling a called-up videophone, can not be programmed to extemporize adequate QR-code/OTP for access, so instead it can be handled by an installed APP at each videophone. The APP's icon only has to be ordered and touched onto the phone screen, to send a correct and per videophone specific OR-code/(and OTP). App is the name herein used for a standard downloadable application software or similar.

This can be all set up at a site and the installer, then sees to it that every participant each gets a proper APP (+OTP) installed and that access point 5 gets adequate capacity/program to manage the at times large data it will get. Given the large amount of data a QR-code (+OTP) can hold, it will be readily facilitated for an adequately constructed/programmed access point 5 to per actual call keep track of and selectively treat each arriving QR code (+OTP).

In allowing authorized B-repliers access merely by their Caller-IDs, U.S. Pat. No. 8,041,016 has some security flaws, in that stolen or spoofed mobiles can force access. By taking a call and require a PIN or similar, security can improve, but at a cost.

The access point 5, located at the B-replier's 1 house and without its own network connection is only responsive to intentional images from its B-replier(s) 1; images that a B-replier 1 only can transfer back when in conversation with a visitor's 2 smartphone 6, which shows the image(s) to camera 15. To further secure this, it can be a prerequisite for the actual downloaded app (with OTP) to emerge at the participating B-replier's 1 phone, that a PIN must precede. This makes stolen phones dysfunctional; and since the app (and QR-code etc.) is only available at the physical individual B-replier 1 phone, spoofing isn't possible either. This PIN can hold unique information.

However, When a B-replier 1 is at the access point 5 where her/his above mentioned image's QR-code (containing the authorization/effectuating data and possibly an OTP by the associated individual QR-code and request from the PIN is registered/programmed as a valid one, a produced like code can be directly shown to the camera 15, giving direct access, as a sort of secure code/card lock for e.g. a building's resident(s).

The PIN can be installed with the APP on each smartphone 6 when the system is installed at a house like earlier mentioned and can contain user-programmable variables, e.g. for specifying the kind of access intended. An optional 12 keypad, card, code or biometric reader or similar can complement the access point 5; and cradle 14 can additionally have an IR or RF interface.

The present invention can thus be seen as an improvement invention to U.S. Pat. No. 8,041,016, in that it provides new and advantageous solutions to problems recognized therein. It is also an improvement of the earlier access control systems, among which also the established and commonly accepted telephone entry systems, such as U.S. Pat. No. 3,947,641, in addition to nowadays high usage costs, are vulnerable to spoofing attacks. The present invention utilizes progressive technology and the fact that smartphones and APPS today hold such immense capacity/data-power.

Various modifications to this invention can be made by one of ordinary skill in the pertaining art, enabled thereto by this specification, without departing from the scope of this invention and the ensuing claims.

The invention claimed is:

1. A system for authorization and control of access to a specially constructed machine, the system comprising: an access point containing a camera means and a display screen or sticker means wherein a visitor desiring access through the access point with a first smartphone calls a B-replier and connects the first smartphone to the B-replier over a telephone network, wherein the B-replier enables the desired access by generating a commanding image indicia which the smartphone reads and thereafter shows to the camera means to permit access; wherein the access point is a vending machine, a parking meter, or an automated teller machine (ATM); and wherein a payment procedure through a point of sale is provided through a telephone network when payment is required; wherein the smartphone photos image indicia shown on the display screen or sticker, thereby transferring the image indicia to the B-replier that in response generates and sends back image indicia to the smartphone which thereupon displays and shows same to the access point's camera so that the access point receives enough required information for accomplishing the desired access or generating a revised image indicia on the display screen for reiterating a visual information loop until enough required information is gathered for accomplishing the desired access.

2. The system of claim 1, wherein the B-replier is connected to a remote database.

3. The system as claimed in claim 1, wherein the access point further contains at least one optional device selected from the group consisting of a lock, a credit card reader, a card reader, a code reader, a biometric reader, an IR interlace, an RF interface, a line interface, a coin slot, a bill slot, a cradle for short range communication with the smartphone, and a keypad.

4. The system of claim 1, wherein the B-replier comprises a second smartphone or a person.

5. The system of claim 4, wherein the B-replier enables access without communication with the visitor by directly presenting B-replier's commanding image indicia to the access point.

6. The system of claim 1, wherein the access point further contains a keypad and the visitor enters a PIN on the keypad which is transferred to the B-replier.

7. The system of claim 1, wherein the commanding image indicia or other indicia consist of at least one of the group consisting of a QR code, an image code, an APP, a face image, a card image, DTMF, card details, or cryptography.

8. A method for authorization and control of access to a specially constructed machine, the method comprising: an access point containing a camera means and a display screen or sticker means wherein a visitor desiring access through the access point with a first smartphone calls a B-replier and connects the first smartphone to the B-replier over a telephone network, wherein the B-replier enables the desired access by generating a commanding image indicia which the smartphone reads and thereafter shows to the camera means to permit access; wherein the access point is a vending machine, a parking meter, or an automated teller machine (ATM); and wherein a payment procedure through a point of sale is provided through a telephone network when payment is required; wherein the smartphone photos image indicia shown on the display screen or sticker, thereby transferring the image indicia to the B-replier that in response generates and sends back image indicia to the smartphone which thereupon displays and shows same to the access point's camera so that the access point receives enough required information for accomplishing the desired access or generating a revised image indicia on the display screen for reiterating a visual in information loop until enough required information is gathered for accomplishing the desired access.

9. The method as claimed in claim 8, wherein the access point further contains at least one optional device selected from the group consisting of a lock, a credit card reader, a card reader, a code reader, a biometric reader, an IR interlace, an RF interface, a line interface, a coin slot, a bill slot, a cradle for short range communication with the smartphone, and a keypad.

* * * * *